Feb. 16, 1954 M. E. WOOD 2,669,400

ARBOR FOR SPOOLS

Filed April 23, 1951

INVENTOR.
MORRIS E. WOOD
BY
Charles S. Perfold
ATTORNEY

Patented Feb. 16, 1954

2,669,400

UNITED STATES PATENT OFFICE 2,669,400

ARBOR FOR SPOOLS

Morris E. Wood, Bronson, Mich., assignor to Higbie Manufacturing Company, a corporation of Michigan Application April 23, 1951, Serial No. 222,428

16 Claims. (Cl. 242—125)

This invention relates generally to fishing tackle, and more particularly is directed to an accessory or arbor fitting adapted for association with the spool of a fishing reel.

In certain types of casting reels the diameter of the cylindrical line supporting surface is appreciably increased by permanently securing an arbor or drum to the spool, in order that less line may be used to better advantage. Due to the fact that the arbor in effect increases the diameter of the shaft, the convolutions of the line will be correspondingly increased to a substantially uniform diameter without resorting to a back fill of line. As a result, the line will not only play out uniformly and smoothly at a faster speed when a cast is made but can be reeled in at a faster rate with less effort, thereby promoting the performance and usefulness of the reel.

When such an arbor constitutes an original permanent component part of the reel assembly the spool is in balance. However, if removed, it becomes damaged and if reassembled the spool generally becomes unbalanced. It is also usually difficult to reanchor or affix such an arbor against relative movement with respect to the spool.

The subject invention contemplates the utilization of an arbor which is adapted to be detachably connected to a conventional shaft or line supporting means in order to facilitate and expedite the proper delivery and return of the line, particularly while casting. Thus, the owner of a conventional reel may promote its efficiency by the simple expedient of attaching thereto the arbor embodying the improved principles of design and construction of the subject invention. It is to be understood that insofar as the subject invention is concerned the arbor sections may also provide a support for film, tape or other line material.

One of the principal objects of the invention is to provide an arbor preferably comprised of a minimum number of corresponding sections or parts which can be easily and quickly assembled and disassembled with respect to a spool an unlimited number of times.

An important object of the invention is to provide an arbor of the character just referred to, in which each of the sections preferably includes a longitudinal shaft-engaging bearing and a pair of corresponding longitudinal yieldable or resilient locking means spaced circumferentially from the bearing for snap connection with a shaft of a spool.

A significant object of the invention is to provide an arbor in which the longitudinal yieldable locking portions above referred to are preferably made in the form of inturned walls which are arranged substantially diametrically opposite one another. More particularly, the locking portions are located adjacent the longitudinal marginal edges of each section and the longitudinal edges of the locking portions are so spaced that they will nest in grooves formed in a spool shaft in a manner whereby to detachably secure each arbor section to the shaft and at the same time serve as keys to prevent relative rotation between a section and shaft. The size and shapes of the locking portions and grooves are also preferably so constructed that the locking portions will engage the shaft so as to constitute bearings assisting to support an arbor section thereon. In other words, the locking means perform a plurality of purposes or functions.

A particular object of the invention is to provide an arrangement whereby the wall of each arbor section will yield or flex jointly with its locking means when each section is applied to a shaft.

Another object of the invention is to provide the arbor sections with pairs of apertures so arranged that when a line is passed therethrough and about the arbor the line will tend to maintain the arbor sections in assembly.

A further object of the invention is to design and construct the sections so they will cooperate with each other and the flanges of the spool in such a manner that the arbor provides a firm cylindrical support for the line, and the line is prevented from being caught between the end extremities of the sections and the inner convex surfaces of the spool flanges.

Additional objects or attributes of the invention reside in its simplicity, durability, light weight, and low cost of manufacture.

Other objects and advantages of the invention will become evident after considering the description hereinafter set forth in conjunction with the drawing annexed hereto.

Figure 1:
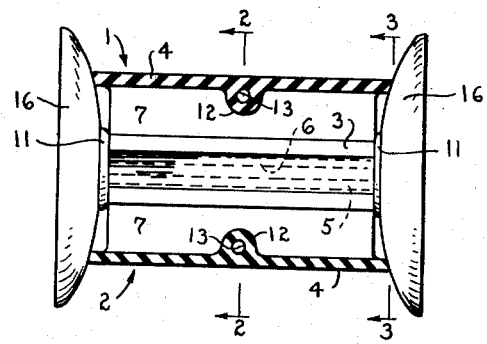
Figure 1 is a front view of a conventional reel spool showing the arbor embodying the invention applied thereto, with portions of the arbor broken away for the purpose of illustrating its operative relationship with the spool.

The arbor embodying the improved principles of design and construction of the subject invention exemplified in the drawing is preferably comprised of two sections generally designated 1 and 2, substantially identical in character and constructed of some desirable material impervious to water, such as moulded plastic having yieldable properties suitable for the purposes above described.

Each of the arbor sections is preferably made in the form of a shell substantially semi-cylindrical in character. These sections when assembled on a conventional shaft 3 of a fishing reel spool provide a firm cylindrical supporting surface for a line. More specifically, each section includes, among other things, a semi-cylindrical line supporting wall 4 of substantially uniform thickness, a pair of inturned corresponding longitudinal radial locking members or portions 5 and 6 and an inturned longitudinal radial shaft engaging bearing member or portion 7. The locking portions 5 and 6 are resilient and substantially planar or preferably wall-like in character. They are substantially identical and arranged substantially diametrically opposite each other in the same plane and extend radially inward from the longitudinal marginal bevelled edges 8 of the section. The inner longitudinal edges of the locking portions are slightly rounded and spaced apart a distance which is somewhat less than the diameter of the spool shaft so that locking portions on each section will snap into longitudinal grooves 9 formed in the shaft. These grooves are preferably arcuate in cross-section and constitute abutments. They are disposed diametrically opposite each other. As a result the shaft is provided with a pair of diametrically disposed peripheral surfaces 10.

Figures 5, 6:
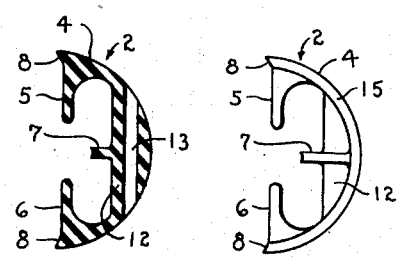
Figure 5 is a transverse sectional view taken substantially on line 5—5 of Figure 4.
Figure 6 is an end view of one of the corresponding arbor sections looking in the direction of arrow lines 6—6 in Figure 4.
Figure 7:
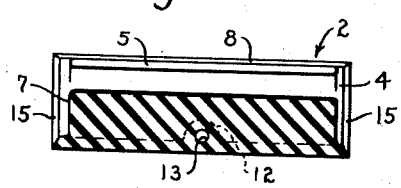
Figure 7 is a longitudinal section of an arbor section taken substantially on line 7—7 of Figure 4.

The shaft engaging bearing member or portion 7 is also preferably wall-like in character and is located along the medial or center of the section in a plane substantially at right angles to the plane formed by the locking portions 5 and 6. Otherwise expressed, the locking portions and bearing portion on each section are arranged substantially ninety degrees apart when viewed from the end as in Figures 5 and 6.

The locking portions and bearing on each arbor section are preferably of the same thickness and length and their ends are preferably inset from the ends of the section to provide clearance for the abutments 11 on the shaft as shown in Figure 1. The radial distance between the inner longitudinal marginal ends of the locking portions and the peripheral surface of the wall 4 are equal for disposition in the grooves 9 whereas the radial distance between the inner longitudinal marginal edge of the bearing and peripheral surface of wall 4 is less for engaging a peripheral surface 10 of the shaft 3. The longitudinal edge of the bearing is preferably made arcuate so as to conform to the curvature of the shaft as shown in Figures 2 and 3.

Any suitable means may be provided for attaching the fish line to the arbor, but as herein illustrated, this is preferably accomplished by forming an enlargement 12 on the inner side of wall 4 on each side of each arbor section. An aperture 13 extends through each enlargement in a general chordal direction, or substantially parallel to the plane formed by the locking portions 5 and 6. When the arbor sections are properly mounted on the spool the aperture 13 in one section is arranged parallel to the corresponding aperture in the other section so that when a line 14 is threaded through the apertures and about the sections and tied as depicted in Figure 2, the line will assist in maintaining the sections assembled. Obviously, the line may be passed through only one of the apertures and about the arbor sections.

As clearly exemplified in the drawings, the end margins of the arbor sections are preferably bevelled as indicated at 15 so that they will intimately engage the convex surfaces of the spool flanges 16. The longitudinal marginal edges of the sections are also preferably bevelled as previously indicated so as to insure longitudinal engagement only adjacent the peripheral surfaces of the arbor sections. Such an arrangement serves to provide a stable support for the line, and at the same time will prevent the line from receding and becoming caught between the extremities of the sections and spool flanges.

Figure 2:
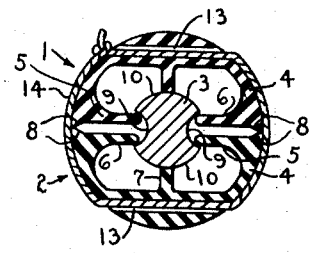
Figure 2 is a transverse section taken substantially on line 2—2 of Figure 1 depicting the manner of keying the arbor sections to the shaft, and mode of connecting a fish line to such sections.
Figure 3:
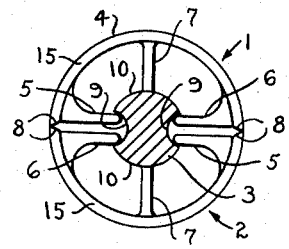
Figure 3 is a transverse section taken substantially on line 3—3 of Figure 1.
Figure 4:
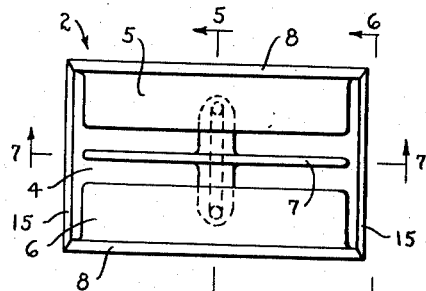
Figure 4 is an inside view of one of the arbor sections.

In view of the foregoing description, it will be apparent that each arbor section can be easily and quickly assembled with the spool shaft by merely arranging the section so that the longitudinal marginal edges of the resilient locking portions 5 and 6 are brought into engagement with a peripheral surface 10 of the shaft at predetermined locations adjacent the grooves 9, whereupon appropriate manual pressure toward the shaft will cause the locking portions to first spread apart substantially radially and then snap into the grooves with the bearing 7 engaging the mid-point of a peripheral surface 10 of the shaft as shown in Figures 2 and 3. With this arrangement, each arbor section is keyed or locked for rotation with the spool. It should be noted that since the locking portions engage the shaft they also constitute bearing portions. It should also be noted that each of the locking portions is reenforced by a longitudinally extending internal fillet so that the locking portions will properly enter the grooves in the spool shaft. The relationship between the various parts and grooves is such that when both arbor sections are on the shaft the longitudinal marginal edges of the sections will press against one another to provide a substantially uniform cylindrical supporting surface for the line. The parts are preferably so constructed and arranged that the locking portions on each section will snap into the grooves the moment the bearing engages a peripheral surface 10 of the shaft. The locking portions yield or flex and some flexation also occurs in the wall 4 on either side of the bearing 7. Thus, the wall and locking portions jointly yield or flex when the arbor is applied to a shaft. Although the locking portions 5 and 6 and bearing portion 7 are of a continuous character it is to be understood that each of the portions may be formed to provide a plurality of fingers for engaging the shaft.

With this unique setup, the sections can be readily detachably connected to the spool without the use of a plurality of separate, easy-to-lose parts, or application of tools. In other words, the arbor is comprised solely of two substantially identical parts, and the design and construction are such that the method of attaching them to a spool is obvious. This is an important factor as it reduces considerably the cost of assembly in the factory, and facilitates assembly at the place of use. Moreover, since the arbor is constructed of an impervious material such as plastic, the overall weight of the reel is not materially increased, and any question of rust or corrosion is entirely eliminated.

While the foregoing invention has been described with great particularity, and in a desirable form, it will be readily understood that various changes in the arrangement, construction and combination of parts, as well as substitution of equivalents and substitution of materials may be made in the device without departing from the spirit of the invention as definitely determined by the appended claims.

I claim:

1. An arbor section for a fishing reel spool having an inner longitudinal bearing portion shaped to engage the spool and an external line supporting portion, and a pair of corresponding longitudinally extending means integral with the line supporting portion and located inwardly therefrom in substantially a single plane for yieldably embracing and contacting a part of the spool for detachably securing the section thereto.

2. An arbor section for a fishing reel spool provided with abutment means and having an inner bearing portion shaped to engage the spool and an external line supporting portion, and a pair of corresponding longitudinally extending means integral with the line supporting portion and located inwardly therefrom and substantially in a single plane for yieldably embracing and contacting the abutment means for detachably securing and keying the section to the spool.

3. A moulded one-piece arbor section for a spool having a shaft provided with a longitudinal groove, said section having an inner bearing portion shaped to engage the spool shaft and an external arcuate line supporting portion, a pair of longitudinal flexible members integral with the line supporting portion and located inwardly therefrom for yieldably embracing the spool shaft and engaging the groove for detachably securing and keying the section to the shaft, and said arcuate portion being provided with a hole extending chordally therethrough for receiving a line.

4. In combination: a spool, an arbor section having an external line material supporting portion, and oppositely disposed longitudinally extending means integral with the line supporting portion and located inwardly therefrom yieldably embracing and contacting a part of the spool and serving to detachably secure the section thereto.

5. A moulded plastic arbor section for a spool, said section having an arcuate line material supporting portion, a longitudinal bearing means integral with the arcuate portion extending radially inward therefrom and shaped to engage the spool, and a pair of longitudinal planar locking members equally spaced from the bearing means and extending radially inward from the arcuate portion toward one another in substantially the same plane for yieldably embracing and contacting the spool for detachably securing the section thereto.

6. A pair of complementary arbor sections for attachment to a fishing reel spool, each of said sections having a line supporting portion and an internal bearing shaped to engage the spool, each of said sections also being provided with a pair of corresponding longitudinally extending integral yieldable gripping means for yieldably embracing and engaging a part of the spool for detachably securing the sections thereto to form an arbor about the spool, and at least one of said sections being provided with means to assist in connecting a line to the section.

7. A pair of complementary arbor sections for attachment to a fishing reel spool, each of said sections having a semi-cylindrical line supporting portion and an internal centrally disposed radial bearing shaped to engage the spool, and each of said sections also being provided with a pair of longitudinally extending integral yieldable gripping means substantially planar in character and equally spaced from the bearing for yieldably embracing and engaging a part of the spool for detachably securing the sections thereto to form an arbor about the spool, the pairs of gripping means on the respective sections being substantially identical.

8. A pair of substantially identical complementary arbor sections for attachment to a fishing reel spool, each of said sections having a line supporting portion and three integral longitudinal internal bearings shaped to engage the spool, certain of said bearings being yieldable for yieldably embracing and engaging a part of the spool for detachably securing the sections thereto to form an arbor about the spool, and means on each of said sections for keying the sections to the spool.

9. A pair of moulded complementary arbor sections for attachment to a reel having a hub, each of said sections having a semi-cylindrical material supporting portion and an internal bearing shaped to engage the hub, and each of said sections also being provided with internal spaced longitudinal flexible portions shaped to detachably secure the sections about the hub to form an arbor therefor, the flexible portions on the respective sections being substantially identical.

10. A pair of moulded identical arbor sections for attachment to a reel having a hub, each of said sections having a material supporting portion, a bearing shaped to engage the hub, and a pair of spaced integral longitudinal yieldable substantially planar gripping means shaped to detachably secure the sections about the hub to form an arbor therefor.

11. In combination: a reel having a hub, a pair of complementary arbor sections, each of said sections having a material supporting portion and an internal bearing engaging the hub, and each of said sections also being provided with a pair of integral internal longitudinal yieldable members detachably securing the sections to the hub to form an arbor therefor, the yieldable members on the respective sections being substantially identical.

12. In combination: a reel having a hub provided with grooves, a pair of complementary arbor sections, each of said sections having a material supporting portion and an internal bearing engaging the hub, and each of said sections also being provided with a pair of complementary longitudinal integral yieldable members seated in the grooves detachably securing and keying the sections to the hub to form an arbor therefor.

13. In combination: a reel having a hub, a pair of complementary moulded arbor sections, each of said sections having an external semi-cylindrical material supporting portion, a bearing engaging the hub, and a pair of longitudinal integral yieldable means detachably securing the sections to the hub to form an arbor about the hub, the yieldable means on the respective sections being identical, and a chordally disposed hole provided in each of said sections, said holes being arranged in parallel relation on opposite sides of the hub so that material can be threaded through the holes and about the sections to assist in attaching the material to the sections.

14. In combination: a reel having a hub provided with a pair of longitudinal grooves, a pair of complementary arbor sections, each of said sections having a material supporting portion and an internal bearing engaging the hub, each of said sections also being provided with a pair of integral longitudinal planar yieldable gripping means respectively seated in the grooves detachably securing the sections to the hub to form an arbor therefor, and a hole provided in each of the sections, the holes in the sections being arranged in parallel relation to one another and the planes of the gripping means so material can be inserted through the holes to assist in attaching the material to the sections.

15. A pair of arbor sections shaped to form an arbor about a spool, each of said sections having an external substantially semi-cylindrical line supporting wall with longitudinal marginal edges and an internal bearing portion shaped to engage a part of a spool, substantially identical locking means on the respective sections for detachably securing the sections to a spool, and a hole provided in the wall of each section and parallel to a plane formed by the longitudinal edges of the section, the arrangement being such that when the bearing portions of the sections are brought into proper engagement with the spool part the holes will be arranged in parallel relation to one another so that a line can be inserted through one or both holes for wrapping about the sections in a manner to assist in securing the sections to the spool.

16. A pair of arbor sections shaped to form an arbor about a shaft, each of said sections having an external substantially cylindrical line supporting wall with longitudinal marginal edges and an internal bearing portion shaped to engage the shaft, substantially identical locking means on the respective sections for detachably securing the sections to the shaft, and a hole provided in the wall of each section and parallel to a plane formed by the longitudinal edges of the section, the arrangement being such that when the bearing portions of the sections are brought into proper engagement with the shaft the holes will be arranged in parallel relation to one another so that a line can be inserted through one or both holes in a manner to facilitate attachment of the line to one or both sections.

MORRIS E. WOOD.

References Cited in the file of this patent

UNITED STATES PATENTS

| Number | Name | Date |
|---|---|---|
| 806,064 | Carter | Nov. 28, 1905 |
| 1,855,738 | Case | Apr. 26, 1932 |
| 2,336,981 | Clickner | Dec. 14, 1943 |
| 2,344,665 | Adams | Mar. 21, 1944 |